April 14, 1925.
W. R. JOHNSTONE ET AL
DIRIGIBLE HEADLIGHT
Filed June 22, 1922
1,533,424
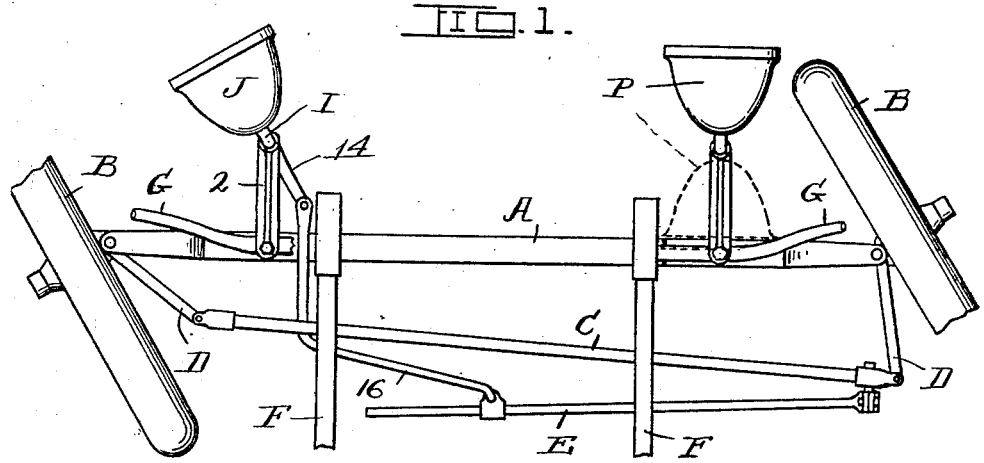
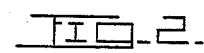
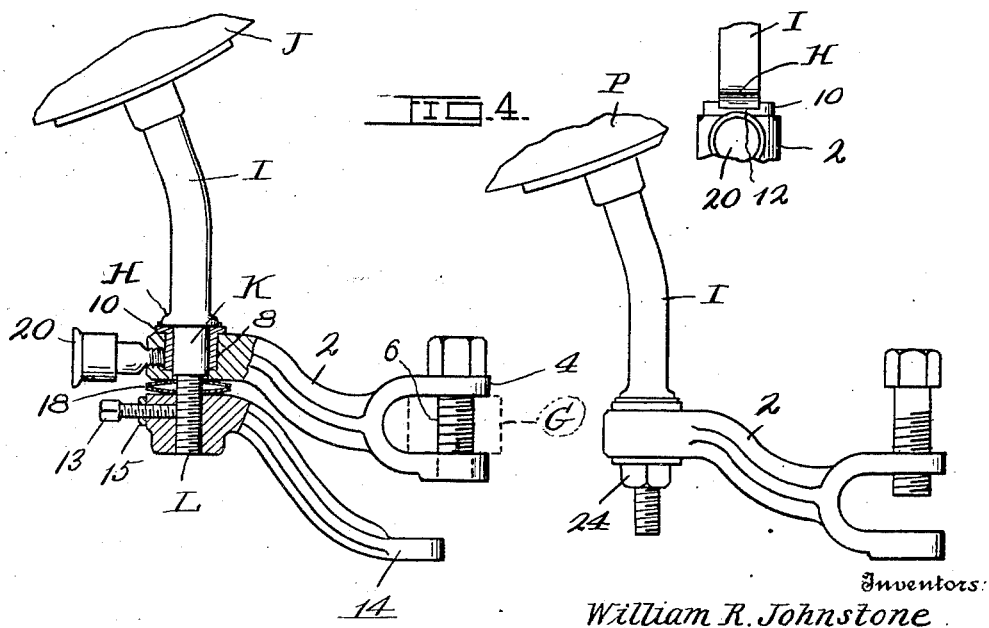
Witness:
Fred G. Fischer.
Inventors:
William R. Johnstone
and William A. McDougall,
By F. G. Fischer,
Attorney.

Patented Apr. 14, 1925.

1,533,424

UNITED STATES PATENT OFFICE.

WILLIAM R. JOHNSTONE AND WILLIAM A. McDOUGALL, OF KANSAS CITY, MISSOURI; SAID JOHNSTONE ASSIGNOR TO SAID McDOUGALL.

DIRIGIBLE HEADLIGHT.

Application filed June 22, 1922. Serial No. 570,096.

*To all whom it may concern:*

Be it known that we, WILLIAM R. JOHNSTONE and WILLIAM A. McDOUGALL, citizens of the United States, residing at Kansas City, in the county of Jackson and State of Missouri, have invented certain new and useful Improvements in Dirigible Headlights, of which the following is a specification.

Our invention relates to new and useful improvements in dirigible headlights for automobiles and one object is the provision of simple and inexpensive mechanism which is automatically controlled by the steering gear to effect corresponding adjustment of one of the headlights, whereby light from the latter will be projected in the direction of travel of the front wheels and directly in advance of the same when taking curves in the road.

A further object is to provide an adjustable mounting for the companion headlight, so that the same may be manually rotated to direct its beams upon different parts of the motor vehicle and thus answer the purpose of a trouble light.

Another object is to so arrange and construct the mechanisms constituting our invention that the headlights which come as regular equipment with the automobile can be used without making any alterations therein, or necessitating the drilling of holes or otherwise changing the construction of the automobile, but on the contrary can be installed without the use of special tools or the employment of a skilled mechanic.

Other objects will hereinafter appear, and in order that the invention may be fully understood, reference will now be had to the accompanying drawing in which:

Fig. 1 is a fragmentary plan view of the forward portion of an automobile showing the application of our invention thereto.

Fig. 2 is an enlarged broken side elevation partly in section of the dirigible headlight and its mounting.

Fig. 3 is a fragmentary detail.

Fig. 4 is an enlarged broken side elevation of the trouble headlight and its mounting.

In the drawings which show a portion of a well-known automobile, A designates the front axle, B the front wheels, C the spindle arm connecting rod pivoted at its ends to the arms D, E the steering gear connecting rod for actuating the spindle arm connecting rod C, F the longitudinal sills of the chassis, and G the forward fender brackets. All of the foregoing are of usual construction and form no part of the present invention.

Referring now more particularly to the parts constituting our invention, 2 designates a lamp bracket having a bifurcated lower end 4 adapted to fit upon one of the forward fender brackets G, to which it is secured by suitable means such as a screw 6.

The lamp bracket 2 extends upwardly and forwardly and is provided at its forward end with a bearing 8 extending part way therethrough and provided at its upper end with a circular shoulder 10 having a channel 12 extending diametrically therethrough to receive the complemental shoulder H on the post I carrying the dirigible lamp J. The post I which is of ordinary construction has the usual shank K extending below the shoulder H and terminating in a reduced threaded portion L.

As shown more clearly by Fig. 2, the shank K fits within the bearing 8 while the reduced portion L projects below said bearing 8 and is equipped with an arm 14, which extends backwardly beneath the lamp bracket 2 and is pivoted to the forward end of a connecting rod 16 pivoted at its rear end to the steering rod E in order to be controlled thereby. The forward end of the arm 14 is threaded upon the reduced lower portion L of the shank K and further secured by a set screw 13 equipped with a lock nut 15 to bear against the front end of the arm 14 and thus prevent said set screw 13 from coming loose.

18 designates antirattling means in the form of two reversely-disposed spring washers which are loosely mounted upon the threaded portion L of a shank K and interposed between the lamp bracket 2 and the arm 14 to press downwardly upon the latter and thus hold the shoulder H firmly in the channeled portion 12 of the shoulder 10 and hold the latter upon the lamp bracket 2, so as to prevent independent vertical movement of the post I, the bearing 8, and said lamp bracket 2.

In order to reduce to a minimum the wear incident to the bearing 8 turning in the lamp bracket 2, we provide the forward end of the latter with a grease cup 20 for holding a lubricant for said bearing 8 and the surrounding portion of the lamp bracket 2.

With the mechanism for the dirigible headlight J arranged and constructed as shown and described, it is obvious that said headlight will always face in the direction of travel of the front wheels B and thus cast light directly in front of the automobile whether the same be traveling over a straight road or taking a curve.

As shown by Fig. 1, the headlight P may be adjusted to cast its beams straight ahead as shown by full lines, or adjusted to the dotted line position to cast its beams backward over the automobile. The post I of the headlight P is mounted in a lamp bracket 2 which is a duplicate of the lamp bracket 2 above-described, but the steering arm 14 and the washers 18 are dispensed with, the post I being locked in any of its adjusted positions by suitable means such as a nut 24 threaded upon the lower end of said post I.

In installing our invention the headlights J and P are removed from the holes in the fender brackets G to which our lamp brackets 2 are secured by means of the screws 6 which are passed through the same holes in the fender brackets G provided to receive the posts I. Both lamps can be installed in a short time without the use of special tools and when installed will not interfere with the operation of any standard shock absorbers associated with the forward spring and the axle A of the automobile.

From the foregoing description it is apparent that we have provided devices embodying the advantages above pointed out, and while we have shown and described the preferred construction, combination and arrangement of parts, we reserve the right to make such changes as properly fall within the spirit and scope of the claims.

Having thus described our invention, what we claim and desire to secure by Letters Patent, is:

1. In combination with a headlight and its post, a lamp bracket adapted to be secured at its rear end to the fender bracket of an automobile, a bearing journaled in the forward end of said lamp bracket and provided at its upper end with a channel to receive a complemental shoulder on the headlight post to rotate therewith, a steering arm secured at one end to the lower end of said headlight post where the same projects through said bearing, means connecting the opposite end of said steering arm to the steering mechanism of the automobile, and antirattler means interposed between the lamp bracket and said steering arm.

2. In combination with a headlight and its post, a lamp bracket adapted to be secured at its rear end to the fender bracket of an automobile, a bearing journaled in the forward end of said lamp bracket and provided at its upper end with a channel to receive a complemental shoulder on the headlight post which latter extends through the former, means for lubricating said bearing and the surrounding portion of the lamp bracket, a steering arm secured to the lower end of said headlight post and adapted to be connected to and actuated by the steering mechanism of the automobile and in turn rotate the headlight, and antirattler means interposed between the lamp bracket and said steering arm.

In testimony whereof we affix our signatures, in the presence of two witnesses.

WILLIAM R. JOHNSTONE.
WILLIAM A. McDOUGALL.

Witnesses:
L. J. FISCHER,
F. C. FISCHER.